(12) United States Patent
Bloebaum (10) Patent No.: US 6,188,351 B1
(45) Date of Patent: Feb. 13, 2001

(54) METHOD FOR IMPROVING SIGNAL ACQUISTION IN A GLOBAL POSITIONING SYSTEM RECEIVER

(75) Inventor: Leland Scott Bloebaum, Cary, NC (US)

(73) Assignee: Ericsson Inc., Research Triangle Park, NC (US)

( * ) Notice: Under 35 U.S.C. 154(b), the term of this patent shall be extended for 0 days.

(21) Appl. No.: 09/353,874

(22) Filed: Jul. 15, 1999

Related U.S. Application Data (60) Provisional application No. 60/096,436, filed on Aug. 13, 1998.

(51) Int. Cl.[7] ........................................................ H04L 7/00
(52) U.S. Cl. .................................. 342/357.15; 342/357.1
(58) Field of Search ........................... 342/357.15, 357.1; 455/456

(56) References Cited

U.S. PATENT DOCUMENTS

| | | |
|---|---|---|
| 4,445,118 | 4/1984 | Taylor et al. . |
| 5,418,538 | 5/1995 | Lau . |
| 5,663,734 | 9/1997 | Krasner . |
| 5,663,735 | 9/1997 | Eshenbach . |
| 5,841,396 | 11/1998 | Krasner . |
| 6,070,078 * | 5/2000 | Camp, Jr. et al. .................. 455/456 |

FOREIGN PATENT DOCUMENTS

| | | |
|---|---|---|
| 0957370 | 11/1999 | (EP) . |
| 2277232 * | 10/1994 | (GB) ............................. H04B/7/12 |
| WO 9601531 | 1/1996 | (WO) . |
| WO 99825158 | 6/1998 | (WO) . |
| WO 9919743 | 4/1999 | (WO) . |

OTHER PUBLICATIONS

Seybold, John S. et al,I "An Expanding–Search Algorithm for Coarse Acquisition of DSSS Signals" Military Communications Conference, 1996. MILCOM'96 Conf. Proc. IEEE, vol. 3, pp. 993–997.*

* cited by examiner

Primary Examiner—Gregory C. Issing
(74) Attorney, Agent, or Firm—Wood, Phillips, VanSanten, Clark & Mortimer (57) ABSTRACT

A method and system improves signal acquisition in a Global Positioning System (GPS) receiver by providing information to focus the acquisition search in the receiver. In particular, the invention relates to the case where a GPS receiver is integrated with a transceiver that is capable of communicating with a cellular or PCS network via the air-interface particular to that network. Standard information provided by the network is used to assist the integrated GPS receiver and improve its sensitivity and latency. The result of this improvement is that the receiver can rapidly acquire satellites and compute its position in environments where conventional, stand-alone GPS receivers cannot. This added performance is very important for the emergency location application, since the user may have high expectations for personal safety in a variety of situations. Furthermore, the rapid acquisition reduces power consumption, which is very important for battery-powered devices utilizing such combined GPS and cellular technologies.

10 Claims, 6 Drawing Sheets

METHOD FOR IMPROVING SIGNAL ACQUISTION IN A GLOBAL POSITIONING SYSTEM RECEIVER

This application claims the benefit of U.S. Provisional Application No. 60/096,436, filed Aug. 13, 1998.

FIELD OF THE INVENTION

This invention relates to Global Positioning System (GPS) receivers and, more specifically, to using information from a cellular network to reduce the time spent acquiring the signals broadcast by GPS satellites.

BACKGROUND OF THE INVENTION

Determining the geographical position of a mobile station within a cellular network or other Public Land Mobile Network (PLMN) has recently become important for a wide range of applications. For example, positioning services may be desired by transport and taxi companies to determine the location of their vehicles and to improve the efficiency of dispatch procedures. In addition, for emergency calls, e.g., 911 calls, knowing the exact location of a mobile terminal may be vital in ensuring a positive outcome in emergency situations.

Furthermore, positioning services can be used to determine the location of a stolen car, to identify home zone calls which may be charged at a lower rate, to detect hot spots in a micro cell, or to provide premium subscriber services, e.g., the Where Am I service. The Where Am I service facilitates the determination of, for example, the location of the nearest gas station, restaurant, or hospital to a mobile station.

One technique for determining the geographic position of a mobile station is to use the satellite-based Global Positioning System (GPS). GPS is a satellite navigation system that provides specially coded satellite signals that can be processed in a GPS receiver to yield the position, velocity and time of a receiving unit. Four or more GPS satellite signals are needed to compute the three-dimensional location relative to a fixed coordinate system and the time offset of a receiver clock relative to an absolute time reference.

The GPS system comprises twenty-four satellites (not counting spares) that orbit the Earth in approximately twelve hours. The orbital altitude of the GPS satellites (20,200 Km) is such that the satellites repeat the same ground track and configuration over any point approximately once every twenty-four hours. There are six orbital planes each nominally with at least four satellites in each, that are equally spaced (i.e., 60° apart) and inclined at about 55° relative to the equatorial plane of the Earth. This constellation arrangement ensures that between four and twelve satellites are visible to users from any point on Earth.

The satellites of the GPS system offer two levels of precision in determining the position, velocity and time coordinates at a GPS receiver. The bulk of the civilian users of the GPS system use the Standard Positioning Service (SPS) which has a 2-σ accuracy of 100 meters horizontally, ±156 meters vertically and ±340 ns time. The Precise Positioning Service (PPS) is available only to authorized users having cryptographic equipment and keys and specially equipped receivers.

Each of the GPS satellites transmit two microwave carrier signals. The L1 frequency (centered at 1575.42 MHZ) carries the navigation message as well as the SPS and PPS code signals. The L2 frequency (centered at 1227.60 MHZ) also carries the PPS code and is used to measure the ionospheric delay by receivers compatible with the PPS system.

The L1 and L2 microwave carrier signals are modulated by three binary codes: a 1.023 MHZ Coarse Acquisition (C/A) code, a 10.23 MHZ Precise Code (P-Code) and a 50 Hz Navigational System Data Code (NAV Code). The C/A code is a pseudorandom number (PRN) to code that uniquely characterizes a GPS satellite. All of the GPS satellites transmit their binary codes over the same L1 and L2 carriers. The multiple simultaneously-received signals are recovered by a Code Division Multiple Access (CDMA) correlator. The correlator in a civilian GPS receiver first recovers the C/A Code as modulated by the NAV Code. A Phase Locked Loop (PLL) circuit then separates out the C/A Code from the NAV Code. It should be emphasized that a GPS receiver first needs to determine its approximate location in order to determine which of the GPS satellites are within range. Conversely, a GPS receiver that knows its approximate position can tune faster into the signals transmitted by the appropriate GPS satellites.

The startup of a GPS receiver typically requires the acquisition of a set of navigational parameters from the navigational data signals of four or more GPS satellites. This process of initializing a GPS receiver may often take several minutes.

The duration of the GPS positioning process is directly dependent upon how much information a GPS receiver has. Most GPS receivers are programmed with almanac data, which coarsely describes the expected satellite positions for up to one year ahead. However, if the GPS receiver does not have some knowledge of its own approximate location, then the GPS receiver cannot correlate signals from the visible satellites fast enough, and therefore, cannot calculate its position quickly. Furthermore, it should be noted that a higher signal strength is needed for capturing the C/A Code and the NAV Code at start-up than is needed for continued monitoring of an already-acquired signal. It should also be noted that the process of monitoring the GPS signal is significantly affected by environmental factors. Thus, a GPS signal which may be easily acquired in the open becomes progressively harder to acquire when a receiver is under foliage, in a vehicle, or, worst of all, in a building.

Recent governmental mandates, e.g., the response time requirements of the FCC Phase II E-911 service, make it imperative that the position of a mobile handset be determined accurately and in an expedited manner. Thus, in order to implement a GPS receiver effectively within a mobile terminal while also meeting the demands for fast and accurate positioning, it has become necessary to be able to quickly provide mobile terminals with accurate assistance data, e.g., local time and position estimates, satellite ephemeris and clock information (which may vary with the location of the mobile station). The use of such assistance data can permit a GPS receiver that is integrated with or connected to a mobile station to expedite the completion of its start-up procedures. It is therefore desirable to be able to send the necessary assistance GPS information over an existing wireless network to a GPS receiver that is integrated with or connected to a mobile terminal.

Taylor et al. U.S. Pat. No. 4,445,118 discusses the concept of aiding or assisting GPS receivers. The method described uses a single transmitter, such as a geosynchronous satellite, to provide a single assistance message for a wide geographical area. The assistance data includes a list of GPS satellites in view, the respective satellite positions, and predicted Doppler shifts on the satellite signals. This structure of this message permits the position computation function (PCF) to be done in the user receiver.

Krasner U.S. Pat. No. 5,663,734 describes another GPS receiver approach. The patent is mainly related to the receiver architecture, but discusses how the receiver performance can be improved by assistance. The patent mentions "data representative of ephemeris" and expected Doppler shifts as possible contents of the assistance message.

Lau U.S. Pat. No. 5,418,538 describes a system and method for aiding a remote GPS/GLONASS receiver by broadcasting "differential" information from a like receiver in a "reference station". The reference station broadcasts a visible satellite list and also the associated ephemerides, in one embodiment. The advantage to the remote receiver is three-fold: reduced memory requirements, lower-cost frequency reference, and faster acquisition. The discussion describes the benefit of being able to estimate and remove the Doppler due to the receiver clock inaccuracy after acquiring the first satellite.

Eshenbach U.S. Pat. No. 5,663,735 describes a method whereby a GPS receiver derives an accurate absolute time reference from a radio signal. Optionally, the receiver also derives from the radio signal a frequency reference that is more accurate than the inexpensive crystal oscillator contained in the receiver. The GPS receiver performs the position calculation, and therefore must have the absolute time as well as the ephemeris and clock corrections for the GPS satellites.

In general, the above patents do not exploit the information present in the wireless connection between a user terminal and a cellular network (or PLMN) via an air interface. One proposal that does exploit some of the advantages of GSM-based networks for GPS is T1 standards documents TIPI.5/98-132r2. This proposal is based on placing reference GPS receivers at various nodes in the network, capturing the ephemeris information from these receivers, then providing this information along with a list of visible satellites to all handset-based GPS receivers via messages on GSM downlink bearers. The benefit of this approach is that it allows the handset-based GPS receiver to be fully functional, i.e., it contains the PCF and also can operate in continuous navigation mode. It is very desirable to broadcast the assistance to all GPS-equipped handsets, but it is unlikely that the broadcast facility in current GSM networks can deliver the assistance in a timely manner. Point-to-point delivery may be more feasible since latency is particularly important for emergency location (E911), which is a regulatory requirement in the U.S. market.

While the system proposed in TIPI.5/98-132r2 does exploit some aspects of cellular-GPS integration, there are other aspects where novel methods and systems can provide further gain in performance. The present invention addresses this by solving one or more of the problems discussed above in a novel and simple manner.

SUMMARY OF THE INVENTION

In accordance with the invention there is described a method that bounds the acquisition search range based on information from a cellular base station that indicates the distance of the handset from the base station. In addition, this method uses this same information for high-accuracy time transfer, which also helps to reduce the search range for the GPS signals. This reduces the overall latency in calculating the user's position, which is particularly important for meeting regulatory requirements for emergency location (E911) in the U.S. market.

Broadly, there is disclosed herein the method of reducing code shift searches in a Global Positioning System (GPS) receiver, the GPS receiver being integrated in a mobile station (MS) including a transceiver operating in a wireless network. The method comprises the steps of determining a time period representing round trip propagation delay between the MS and a base transceiver system (BTS) serving the MS, and calculating a boundary of the code shift uncertainty in the MS using the time period.

In one aspect of the invention, the MS has knowledge of position of the GPS satellites and its own approximate location.

In another aspect of the invention, the MS has no knowledge of satellite positions or its own approximate location, but does have knowledge of the elevation angle of the satellites.

It is a feature of the invention that the time period is communicated from the BTS to the MS.

It is another feature of the invention that the time period is a timing advance value identifying a fraction of a symbol transmission rate between the BTS and the MS.

In accordance with another aspect of the invention, the BTS communicates location information of the BTS to the MS and the MS has satellite line-of-sight vector information used in calculating a boundary of the code shift uncertainty.

In accordance with a further aspect of the invention there is disclosed the method of reducing code shift searches in a Global Positioning System (GPS) receiver, the GPS receiver being integrated in a mobile station (MS) including a transceiver operating in a wireless network. The method comprises the steps of determining a state of a transmit air interface of a base transceiver system (BTS) serving the MS at a select time corresponding to a GPS epoch time, transmitting the state of the transmit air interface to the MS, and deriving time of the GPS epoch at the MS using the transmitted state of the transmit air interface.

It is a feature of the invention that the MS locks frequency with the BTS prior to the deriving step.

It is another feature of the invention that the MS synchronizes with the BTS air interface state prior to the deriving step.

It is a further feature of the invention to determine a time period representing round trip propagation delay between the MS and the BTS. The time period is used in the deriving step to derive the time of the GPS epoch.

It is still another feature of the invention that the wireless network is a time-division multiple access (TDMA) system and the state represents bit, time slot and frame at the select time.

There is disclosed in accordance with a further aspect of the invention a system for aligning time base of a mobile station (MS), the MIS including a transceiver operating in a wireless network, and a Global Positioning System (GPS) receiver. The system includes a numerically-controlled oscillator (NCO) for generating epoch timing events for the GPS receiver. A processor is coupled to the transceiver, the receiver and the NCO. The processor includes wireless network processing means for receiving from the receiver a state of a transmit air interface of a base transceiver system (BTS) serving the MS at a select time corresponding to a GPS epoch time and deriving time of the GPS epoch at the MS using the transmitted state of the transmit air interface and controlling operating of the NCO in response to the derived time of the GPS epoch, and GPS processing means for using the epoch timing events from the NCO for performing code shift searches on GPS signals received by the GPS receiver.

In another aspect of the invention, the system includes a phase-locked loop generating a clock signal for the NCO.

In a further aspect of the invention, the GPS processing means implements a position-computation function and includes means for determining offset in the GPS epoch time for further controlling the NCO.

One of the most important tasks of a GPS receiver is making the range measurements to the various satellite transmitters. In the case of civilian-grade GPS, the receiver measures the range by observing phase of the C/A code, which is unique to each satellite. Typically, the receiver must search through the entire 1023-chip period of each satellite until it acquires one. This task is made more difficult if the receiver does not have a very accurate frequency reference and if the signal has been degraded by environmental attenuation and/or design choices. These cases require either more receiver resources or that the acquisition and measurement process is lengthened. Neither option is preferred, since the former adds extra cost and the latter adds latency that may not be acceptable for emergency location scenarios.

The point of this invention is to avoid both alternatives by providing information to focus the acquisition search in the receiver. In particular, the invention relates to the case where a GPS receiver is integrated with a transceiver that is capable of communicating with a cellular or PCS network via the air-interface particular to that network. Standard information provided by the network is used to assist the integrated GPS receiver and improve its sensitivity and latency. The result of this improvement is that the receiver can rapidly acquire satellites and compute its position in environments where conventional, stand-alone GPS receivers cannot. This added performance is very important for the emergency location application, since the user may have high expectations for personal safety in a variety of situations.

Further features and advantages of the invention will be readily apparent from the specification and from the drawings.

DETAILED DESCRIPTION OF THE INVENTION

Figure 1:
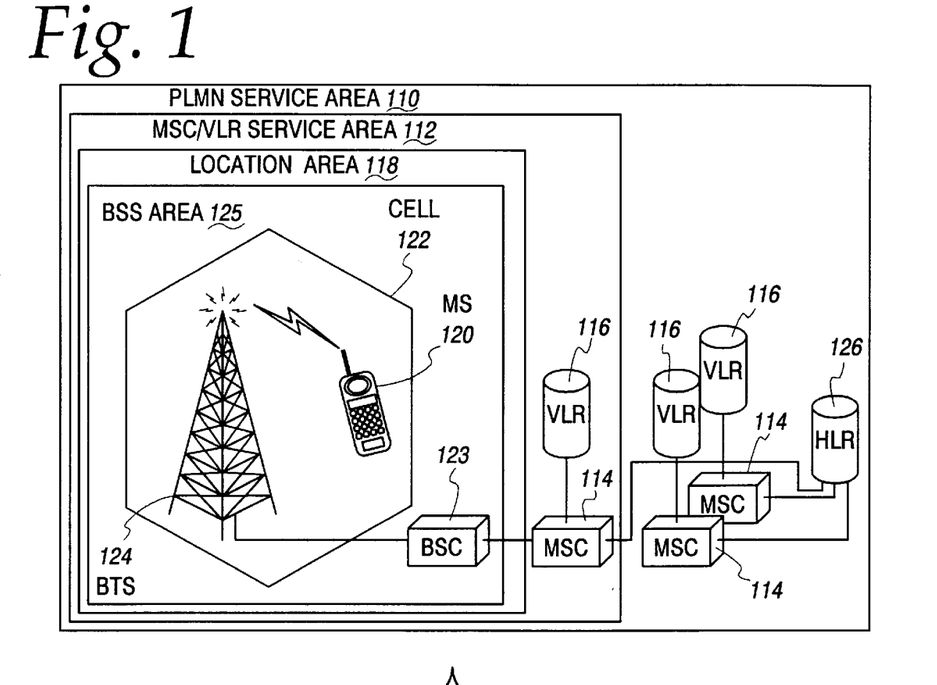
FIG. 1 is a block diagram of a system for aiding GPS receivers in accordance with the invention.

FIG. 1 illustrates a Public Land Mobile Network (PLMN), such as the exemplary GSM cellular network 110, which in turn comprises a plurality of MSC/VLR Service Areas 112, each with a Mobile Switching Center (MSC) 114 and an associated Visitor Location Register (VLR) 116. The MSC/VLR Service Areas 112, in turn, include a plurality of Location Areas (Las) 118, which are defined as that part of a given MSC/VLR Service Area 112 in which a mobile terminal or a mobile station (MS) 120 may move freely without having to update its location to the MSC 114 and/or VLR 116 that controls the LA 118. Each Location Area 118 is further divided into a number of cells 122. The exemplary Mobile Station 120 is the physical equipment, e.g., a car phone or other portable telephone, that is used by a mobile subscriber to communicate with the cellular network 110, with other mobile subscribers, or with other parties outside the subscriber network, whether wireline or wireless.

The MSC 114 is in communication with at least one Base Station Controller (BSC) 123, which, in turn, is in contact with at least one Base Transceiver Station (BTS) 124. The BTS 124 is the physical equipment, illustrated for simplicity as a radio tower in FIG. 1, that provides radio coverage to the cell 122 for which it is responsible. It should be understood that the various BSCs 123 may be connected to several BTSs 124, and may be implemented as stand-alone nodes or integrated with the MSC 114. In either event, the BSC 123 and BTS 124 components, as a whole, are generally referred to as a Base Station System (BSS) 125.

With further reference to FIG. 1, each PLMN Service Area or cellular network 110 includes a Home Location Register (HLR) 126, which is a database containing subscriber information, e.g., user profiles, current location information, International Mobile Subscriber Identity (IMSI) number, and other administrative information, for subscribers who are registered within the PLMN 110. The HLR 126 may be co-located with a specific MSC 114, integrated with MSC 114, or (as illustrated in FIG. 1) service multiple MSCs 114.

The VLR 116 is a database containing information about the plenary set of MSs 120 that are located within an MSC/VLR Service Area 112. If an MS 120 moves into a new physical location such as a new MSC/VLR Service Area 112 (not shown in FIG. 1), the VLR 116 associated with the MSC 114 requests information about the MS 120 from the HLR 126 (while simultaneously informing the HLR 126 about the new location of the MS 120). Accordingly, when the user of the MS 120 wants to make a call, the local VLR 116 will have the requisite subscriber identification information without having to reinterrogate the HLR 126.

The basic GSM access scheme is Time Division Multiple Access (TDMA) with eight basic physical channels per carrier. The carrier separation is 200 KHz. A physical channel is therefore defined as a sequence of TDMA frames as additionally specified by a time slot number and a frequency hopping sequence. The basic radio resource is a time slot that lasts 15/26 ms (i.e., 576.9 $\mu$s) and which transmits information at a modulation rate of approximately 270.83 Kbits/s. This means that the duration of each time slot (including the guard time) is 156.25 bits. Eight time slots constitute a TDMA frame. Thus, a TDMA frame has a duration of 4.615 ms (60/13 ms).

Figure 6:
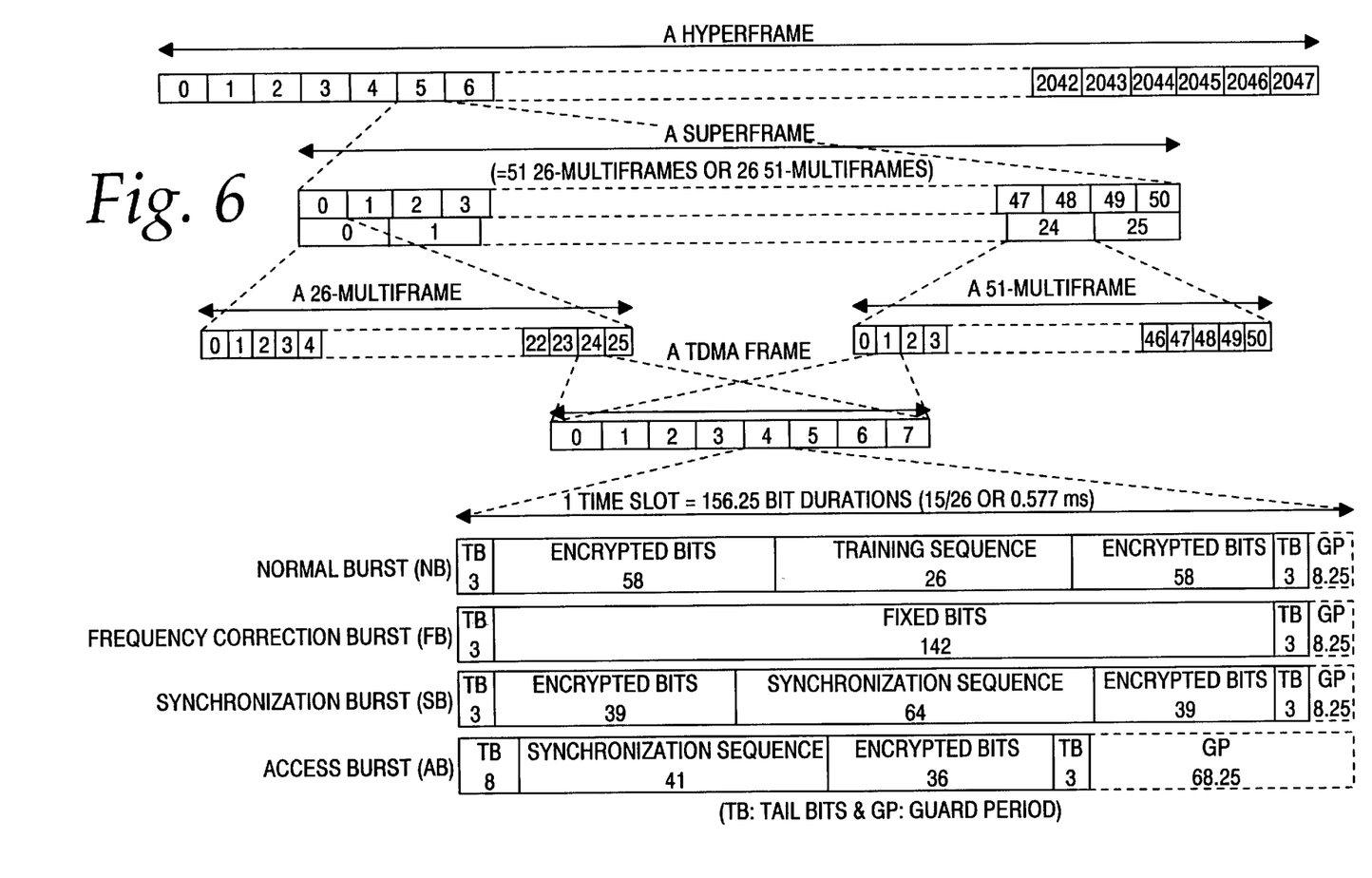
FIG. 6 is a diagrammatic representation of the GSM TDMA timeframe structures.

A diagrammatic representation of the GSM TDMA timeframe structures is depicted in FIG. 6. The longest recurrent time period of the structure is called a hyperframe and has a duration of 3 h, 38 m 53 s and 760 ms. GSM TDMA frames are numbered by a Frame Number (FN). The Frame Number (FN) is a cyclic count of successive TDMA frames that runs the range from 0 to 2,715,647 (i.e., 2048×51×26−1, also known as FN_MAX). The Frame Number is incremented at the end of each TDMA frame. The complete cycle of TDMA frame numbers from 0 to 2,715,647 is referred to as a hyperframe. This long period is needed to support certain cryptographic mechanisms defined by the ETSI GSM specification.

A GSM TDMA hyperframe is divided into 2,048 superframes each of which has a duration of 6.12 s. The superframe is the least common multiple of the GSM TDMA time frame structures. The superframe itself is further divided into three kinds of multiframes: 26-multiframes, 51-multiframes and 52-multiframes.

The first kind of the GSM TDMA multiframes is the 26-multiframe which comprises 26 TDMA frames having a total duration of 120 ms. Consequently, a GSM TDMA superframe can have 51 such 26-multiframes. These 26-multiframes are used to carry Traffic Channels (TCH) and associated control channels (including Slow Associated Control Channels (SACCH) and Full-rate Associated Control Channels (FACCH)).

The second type of GSM TDMA multiframe is a 51-multiframe, comprising 51 TDMA frames and having a total duration of 235.4 ms. A GSM TDMA superframe can have 26 such 51-multiframes. These 51-multiframes are used to support broadcast, common control and stand alone dedicated control (and their associated control channels), including, e.g., Broadcast Control Channel (BCCH), Common Control Channel (CCCH) & Stand-alone Dedicated Control Channels (SDCCH) or Packet Broadcast Control Channel (PBCCH) & Packet Common Control Channel (PCCCH).

The third type of GSM TDMA multiframe is a 52-multiframe comprising 52 TDMA frames and having a total duration of 240 ms. A GSM TDMA Superframe can have 25.5 such 52-multiframes. The TDMA frames in a 52-multiframe are numbered from 0 to 51. The 52-multiframe format is used to support packet data traffic and control channels, e.g., Packet Broadcast Control Channel (PBCCH), Packet Common Control Channel (PCCCH), Packet Associated Control Channel (PACCH) & Packet Data Traffic Channel (PDTCH).

As noted earlier, a TDMA frame is made up of eight time slots and has a duration of 4.615 ms (60/13 ms). Each time slot is a time interval of approximately 576.9 $\mu$s (15/26 ms), i.e., 156.25 bit durations, and its physical content is called a burst. As shown in FIG. 6, four different types of bursts are used in the GSM TDMA system.

The first type of burst is the so-called Normal Burst (NB), which contains 116 encrypted bits and includes a guard time of 8.25 bit durations (approximately 30.46 $\mu$s). Normal bursts are used to carry information on traffic and control channels, except for the Random Access Channel (RACH).

The second type of burst is the so-called Frequency Correction Burst (FB), which contains 142 fixed bits and includes a guard time of 8.25 bit durations (approximately 30.46 $\mu$s). Frequency Correction Bursts are used for frequency synchronization of mobile terminals. FBs are equivalent to an unmodulated carrier, that is shifted in frequency, but having the same guard time as the normal burst. FBs are broadcast together with the BCCH. The repetition of FBs is also referred to as the frequency correction channel (FCCH).

The third type of burst is the so-called Synchronization Burst (SB), which contains 78 encrypted bits and a guard period of 8.25 bits. Synchronization Bursts contain a 64-bit long training sequence and carry the information about the TDMA frame number (FN) as well as the Base Station Identity Code (BSIC). SBs are used for time synchronization of a mobile terminal and are broadcast together with the frequency correction burst (FB). The repetition of SBs is also referred to as the synchronization channel (SCH).

The fourth type of burst is the so-called Access Burst (AB). Access Bursts are used for random access and are characterized by a longer guard period (68.25 bit durations or 252 $\mu$s) to cater for burst transmissions from mobile terminals which may know the timing advance at the time of first access (or following a handover). This longer guard period allows for a mobile station to be up to 35 km from a base station transceiver. In exceptional cases the design may be compatible with cases where the cell radii is larger than 35 Km. ABs are used in the (Packet) Random Access Channel (PRACH), after a handover, on the uplink of a channel used for a voice group call in order to request the use of that uplink, as well as on the uplink of the Packet Traffic Control Channel (PTCCH) to allow estimation of the timing advance for a mobile station in a packet transfer mode.

Figure 1A:
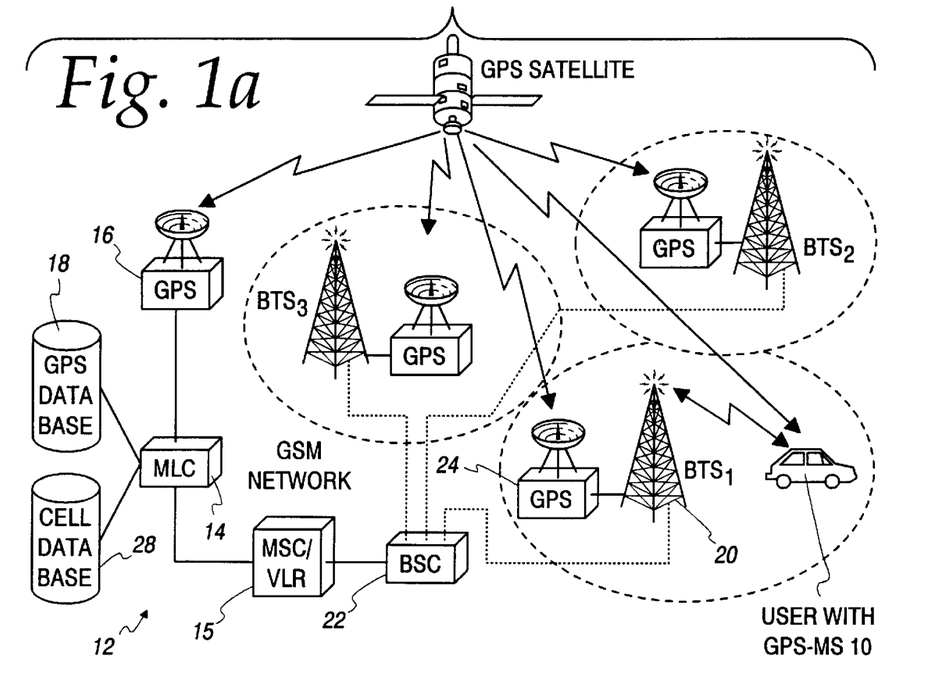
FIGS. 1a and 1b are block diagrams of a system for aiding GPS receivers in accordance with the invention.

A block diagram of a cellular network utilizing assisted-GPS positioning is shown in FIG. 1a. This particular example is based on the GSM standard, as above, but those skilled in the art will recognize that the architecture is generic and can be used to describe other standards. A user device 10 is a mobile station fully capable of communicating with a GSM network 12 over the standard air interface, and includes a GPS receiver that can acquire and measure the signals from the GPS satellites. This device 10 is referred to as a GPS-MS. The GPS-MS is described in greater detail below relative to FIG. 5.

A Mobile Location Center (MLC) 14 is responsible for obtaining certain GPS assistance information and translating it into the format required by the GPS-MS 10. The MLC 14 likely will receive the assistance in the form of ephemeris and clock correction data. Two possible sources for this information are shown. One source is a reference GPS receiver 16 that communicates directly with the MLC 14. This reference GPS receiver 16 acquires the visible GPS signals and demodulates the transmitted navigation messages, which contain the ephemeris and clock corrections for the respective satellites. The GPS receiver 16 also may be used as an accurate time reference, as well as a source for differential GPS (DGPS) corrections. The ephemeris also may be obtained from an external database 18, e.g., via a TCP/IP network.

In this case, the MLC 14 must obtain accurate time and DGPS information from another source. Actually, it may be advantageous for the MLC 14 to have multiple sources of GPS information to improve reliability. As shown in FIG. 1a, the MLC also has access to a cell database 28, which contains coordinates of all cell sites that are in the geographic area served by the MLC. Also shown in FIG. 1a are the standard GSM network elements that were previously described, including the MSC/VLR 15, a Base Station Controller (BSC) 22, and Base Transceiver System (BTS) 20.

Another element in the network shown in FIG. 1a is a GPS receiver 24 attached to each BTS 20. In terms of this invention, the main purpose of the GPS receiver 24 is to provide the BTS 20 with an accurate time reference such that the BTS 20 can relate air-interface timing to GPS time. As such, the configuration is commonly referred to as a "synchronized" network. Note that a synchronized network will provide other benefits (e.g., faster handoff) not directly related to this invention.

Figure 1B:
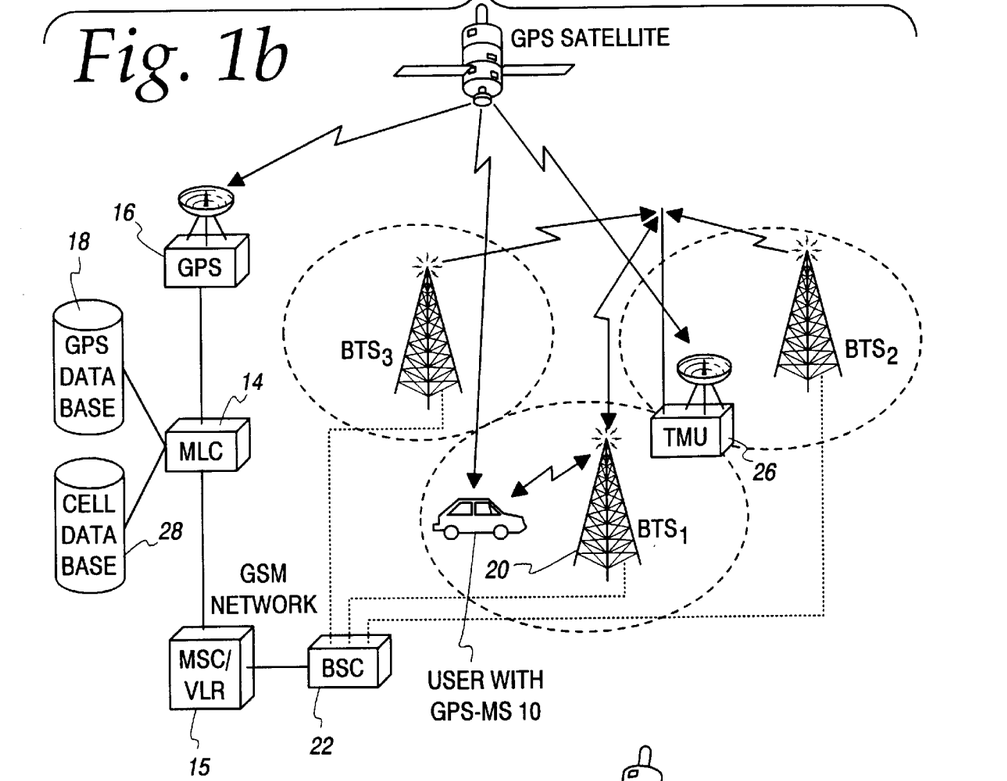

An alternate embodiment of a cellular network utilizing assisted-GPS positioning is shown in FIG. 1b. This embodiment also is based on the GSM standard, and contains standard network components described above, such as BTSs 20, BSCs 22, and MSC/VLR 15. These components function in the same manner as described above, transporting assistance and measurements between the MLC 1 and the GPS-MS 10. The main difference from the network shown in FIG. 1a is that the BTSs 20 in the network do not have GPS receivers to provide timing information, i.e., the network is unsynchronized.

Although the network is unsynchronized, the necessary timing relationships are provided by the Timing Measurement Unit (TMU) 26, which is equipped with one or more cellular receivers and a GPS receiver 24. Once it is placed at a known coordinate, the TMU 26 monitors the cellular transmissions from one or more BTSs that are in the geographic proximity. Events in each monitored BTS transmission are time-stamped with the corresponding GPS time from the GPS receiver 24. The resulting relationships are transmitted to the MLC 14 via the TMU's serving BTS, which is BTS, in the example network shown in FIG. 1b.

Figure 2A:
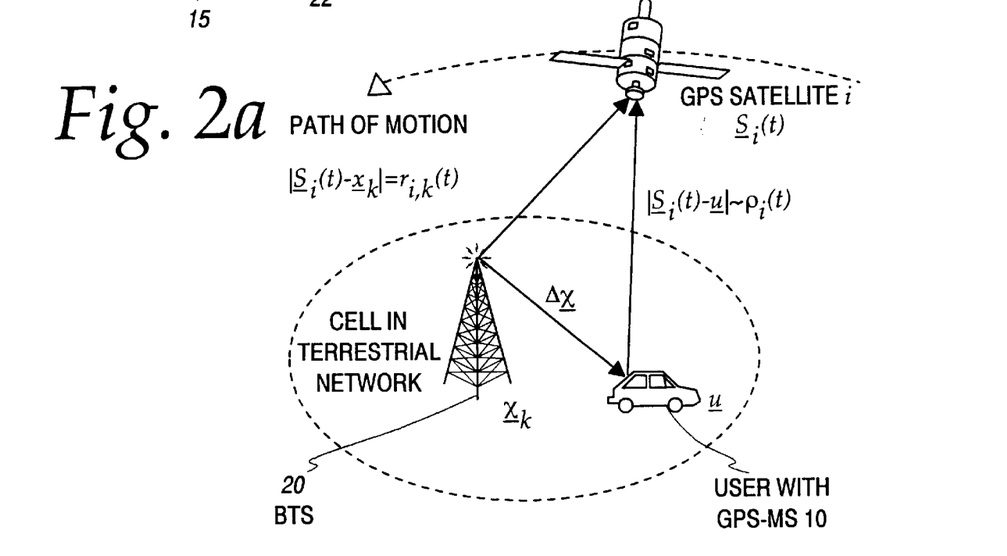
FIG. 2a is a simplified view of a satellite positioned relative to a cellular network base transceiver station and a user terminal or GPS-MS.
Figure 2B:
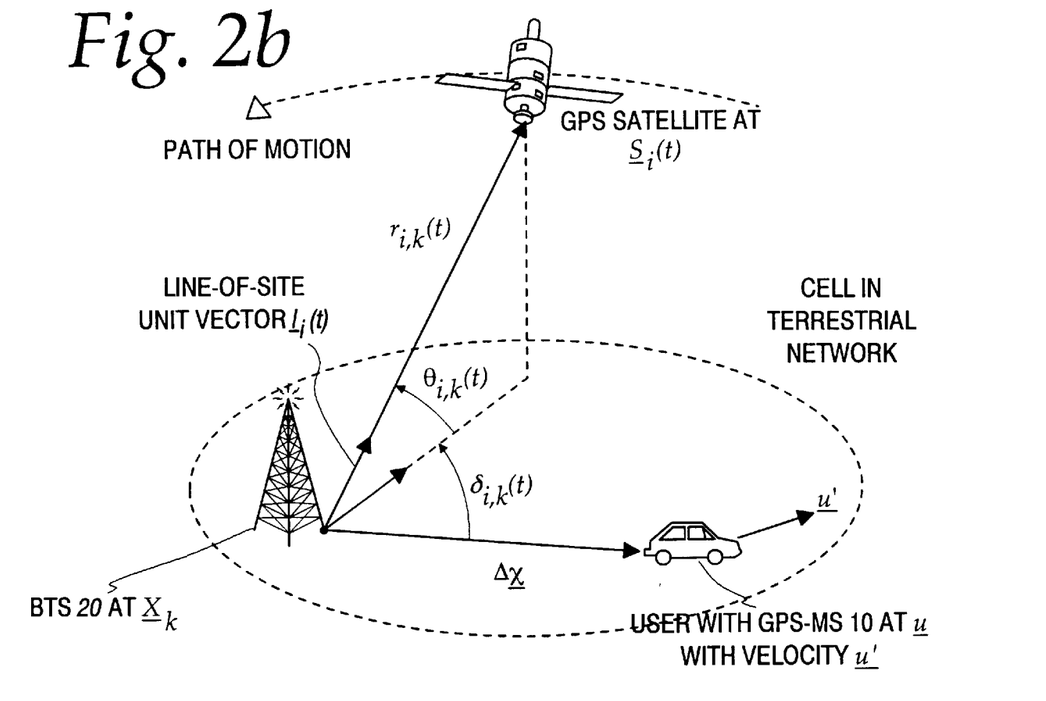
FIG. 2b is a simplified view in spherical coordinates of a satellite positioned relative to a cellular network base transceiver station and a user terminal or GPS-MS.

FIGS. 2a and 2b show a simplified view of a single GPS satellite i and its coordinate relationships to a particular BTS 20 at position $x_k$ and the GPS-MS 10 at position u. The GPS signal acquisition is part of the range-measurement process in the GPS-MS 10. These range measurements are subsequently used to compute an estimate of the position of the GPS-MS 10. According to FIG. 2, the range measured by the GPS-MS 10 at time t from satellite i is given by $$r_i(t) = l_i(t) \cdot (s_i(t) - (x_k + \Delta x)) + c \cdot \qquad (1)$$
$$(b_u(t) - B_i(t)) + c \cdot (I_i(t) + T_i(t) + S_i(t)) + v_i$$
$$= (\hat{l}_i(t) - \Delta l_i(t)) \cdot ((\hat{s}_i(t) - \Delta s_i(t)) - (x_k + \Delta x)) + c \cdot$$
$$(b_u(t) - (\hat{B}_i(t) - \Delta B_i(t))) + c \cdot (I_i(t) + T_i(t) + S_i(t)) + v_i,$$

where c is the speed of light (m/s), $B_i$ is the bias in $i^{th}$ satellite's clock(s), $b_u$ is the bias in the receiver's clock(s), $I_i$ and $T_i$ are the ionospheric and tropospheric delays(s) along the path from satellite i to the receiver, and $S_i$ is the clock bias(s) due to selective availability (SA) in the $i^{th}$ satellite. The term $v_i$ represents measurement noise (m). All hat ("^") terms indicate an estimate or prediction and the delta ("Δ") terms are errors between the prediction and the actual value of the respective parameters. In the same manner, the line-of-sight unit vectors are given by $$l_i(t) = \frac{s_i(t) - (x_k + \Delta x)}{|s_i(t) - (x_k + \Delta x)|}, \quad \hat{l}_i(t) = \frac{\hat{s}_i(t) - x_k}{|\hat{s}_i(t) - x_k|}, \quad \Delta l_i = \hat{l}_i - l_i. \qquad (2)$$

Although the ionospheric, tropospheric, and SA delays have significant contributions to the GPS error budget, they are dominated by other uncertainties in the assistance calculation. Likewise, the modeling error $\Delta B_i$ of the satellite clock bias is relatively small. These terms can be included in the measurement noise term, $v_i$. In addition, if the receiver and satellite position uncertainties, respectively $\Delta_x$ and $\Delta s_i$, are small relative to the range from the satellite, then $$l_i(t) \approx \frac{s_i(t) - (x_k + \Delta x)}{|\hat{s}_i(t) - x_k|}, \quad \Delta l_i \approx \frac{\Delta s_i(t) + \Delta x}{|\hat{s}_i(t) - x_k|}. \qquad (3)$$

Using these assumptions, the equation for the range measurements can be re-written as $$r_i(t) \approx \hat{l}_i(t) \cdot (\hat{s}_i(t) - x_k) - \Delta l_i(t) \cdot (\hat{s}_i(t) - x_k) - \hat{l}_i(t) \cdot \qquad (4)$$
$$(\Delta s_i(t) + \Delta x) + c \cdot (b_u(t) - \hat{B}_i(t)) + v_i$$
$$\approx \hat{l}_i(t) \cdot (\hat{s}_i(t) - x_k) - 2 \cdot \hat{l}_i(t) \cdot (\Delta s_i(t) + \Delta x) + c \cdot$$
$$(b_u(t) - \hat{B}_i(t)) + v_i$$
$$\approx [|\hat{s}_i(t) - x_k| - c \cdot \hat{B}_i(t)] - 2 \cdot \hat{l}_i(t) \cdot \Delta x - 2 \cdot \hat{l}_i(t) \cdot$$
$$\Delta s_i(t) + c \cdot b_u(t) + v_i$$
$$\approx r_{i,k}(t) - 2 \cdot \hat{l}_i(t) \cdot \Delta x - 2 \cdot \hat{l}_i(t) \cdot \Delta s_i(t) + c \cdot b_u(t) + v_i.$$

In the above equation, the first term $r_{i,k}(t)$ represents the expected range measurement to be made by the GPS receiver at $x_k$, provided that the receiver clock is perfectly synchronized with absolute GPS time. This measurement includes the bias of the $i^{th}$ satellite's clock from absolute GPS time and is commonly referred to as a "pseudorange". The remaining terms represent the uncertainty in range measurement at the GPS-MS 10 as it relates to the range measurement at the known location $x_k$. Even if the GPS-MS 10 has knowledge of $r_{i,k}(t)$ by some means, these range uncertainties expand the code space that must be searched to acquire the signal from satellite i. The purpose of this invention is to reduce and manage these uncertainties. Particularly, the GPS-MS 10 uses information from the BTS 20 to reduce code shift searches to more quickly acquire satellite signals.

The second term in equation (4) represents uncertainty in the user position. In terms of the code phase, the Schwarz Inequality states that the uncertainty in code phase for satellite i is bounded by $$|\Delta \phi_{u,i}| < \frac{2 \cdot |\hat{l}_i| \cdot |\Delta x|}{\lambda_{CA}} = \frac{2 \cdot |\Delta x|}{\lambda_{CA}}. \qquad (5)$$

where $\lambda_{CA}$ is the wavelength of the C/A code (293 m/chip for $f_{CA}$=1.023 MHz). For example, if $|\Delta_x|$=15 km, then $-102 < \Delta \phi_{u,i} < +102$ chips. However, $|\Delta_x|$ is unknown so the code phase is also unknown and thus the entire code space (1023 chips) must be searched for each satellite.

When the GPS receiver is part of cellular-based positioning system such as in FIG. 2, then there are several ways to bound the search. One method is for the GPS-MS 10 to assume that $|\Delta_x|$ is less than the maximum cell radius. This parameter is usually specified for a cellular system; for instance, the GSM standard specifies that cells must be <35 km in radius. In this case, the code phase uncertainty is bounded such that $|\Delta \phi_{u,i}|$<239 chips. However, this uncertainty is still nearly half of the 1023-chip code space.

Other information provided by the cellular system can be used to reduce this uncertainty due to user position. In all modern cellular systems, the user terminal 10 times its uplink transmission to the BTS 20 based on the timing of the downlink transmissions from the BTS 20. However, the timing of the uplink transmission as seen by the BTS 20 is affected by the round-trip propagation delay between the BTS 20 and the terminal 10. Without corrective action, the uplink transmission appears to occur later in time as the distance $|\Delta x|$ increases. This is unacceptable in modern digital systems where multiple users share the same channel either by timeslots (TDMA) or pseudo-random codes with delay-dependent cross-correlation properties (CDMA). In order to combat this delay, the BTS 20 observes the timing of the uplink transmissions from the user and instructs the user to transmit earlier in time if the timing is late. This method is known as Timing Advance (TA) in the GSM standard, but is also used in ANSI-136 (TDMA) and IS-95 (cdmaOne). The TA value is typically given in terms of some fraction of the symbol transmission rate; for instance, the GSM TA is specified in one-bit increments.

Figure 3:
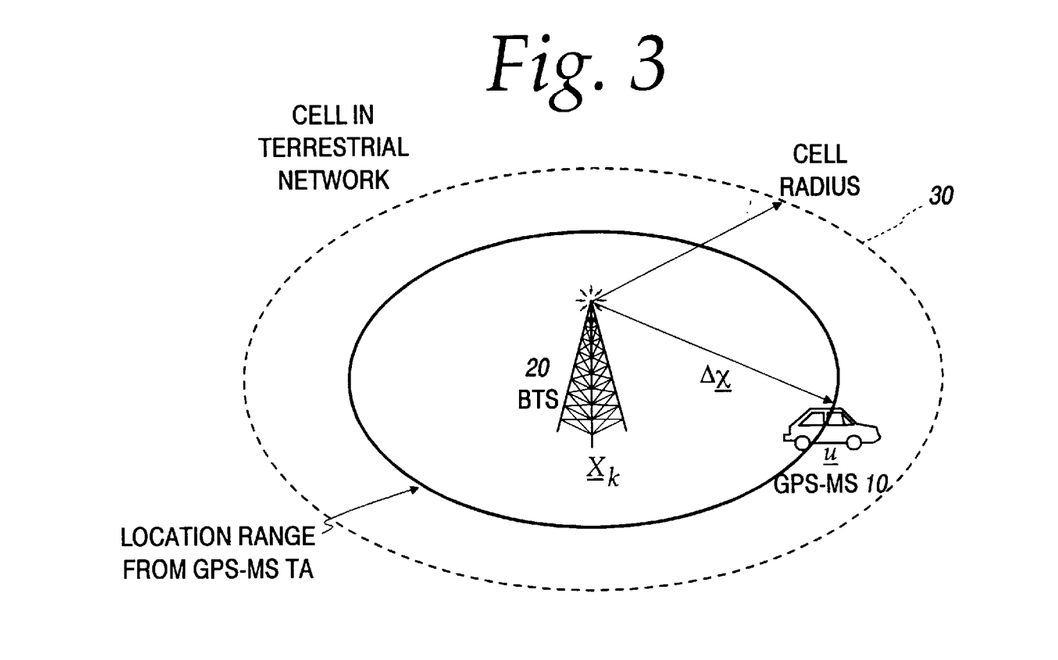
FIG. 3 is a simplified view of a location of the GPS-MS within a cell.

This TA information also can be used to reduce the user-position uncertainty in the GPS acquisition search process. A diagram of an omni-directional, single-cell system with TA is shown in FIG. 3. The TA value specifies that the user is located in a finite-width ring 30 around the BTS 20, with the width of the ring 30 dependent on the resolution of the TA parameter. In the GSM system, the TA is reported in terms of the round-trip delay and thus there is an uncertainty of ±0.5 bit (±580 m) in the round-trip path. Consequently, the radial distance uncertainty is ±0.25 bit (±290 m) or approximately ±1 chip of the GPS C/A-code.

There are three possible scenarios anticipated by this invention where the TA information can be used to reduce the displacement uncertainty. In the first scenario, the GPS-MS 10 has no knowledge of the satellite positions $s_i$, its own approximate position $x_k$, nor the approximate elevation $\theta^{i,k}$. The GPS-MS 10 is not capable of computing its own position in this scenario. The code-phase uncertainty may be bounded by $$|\Delta\phi_{u,i}| < \frac{|\Delta x|}{\lambda_{CA}} < \left(\frac{TA+0.5}{2}\right)\cdot\left(\frac{c\cdot\tau_{TA}}{\lambda_{CA}}\right). \quad (6)$$

where TA is given in the network-specific units and $\tau_{TA}$ is time period of the TA units. In the GSM system, TA is in bits and $\tau_{TA} \approx 3.7$ μs/bit. This approach essentially forms the bound from the worst case when the satellite is on the horizon and is co-linear with the BTS 20 and the GPS-MS 10. In the second scenario, the GPS-MS 10 has knowledge of the satellite elevation $\theta^{i,k}$ at the location of $BTS_k$. Note that it is not necessary for the GPS-MS 10 to have ephemeris for satellite i. Instead, the elevation may be provided by the BTS 20 as measurement assistance, for example. In this case, the uncertainty is bounded by $$|\Delta\phi_{u,i}| < \cos\phi_{i,k}\cdot\left(\frac{TA+0.5}{2}\right)\left(\frac{c\cdot\tau_{TA}}{\lambda_{CA}}\right). \quad (7)$$

In the third scenario, the GPS-MS 10 has knowledge of satellite positions $s_i$ and an estimate of its own position $x_k$. These parameters could be provided by assistance message from the MLC, for instance. Alternatively, the GPS-MS 10 could calculate these positions using satellite ephemeris previously demodulated from the satellite signals and stored in memory. The GPS-MS 10 can use this location information to estimate the line of sight vector, $l_i$. The bounding method in this scenario takes into account that not all of the displacement $\Delta_x$ projects along $l_i$. In this case, the bound of the code-phase uncertainty for satellite i due to unknown user position is $$|\Delta\phi_{u,i}| < \sqrt{1 - \frac{l_i^T x_k x_k^T l_i}{x_k^T x_k}} \cdot \left(\frac{TA+0.5}{2} \cdot \frac{c\cdot\tau_{TA}}{\lambda_{CA}}\right). \quad (8)$$

All vector products utilize standard matrix multiplication rather than the scalar dot product used previously. The square-root term is the magnitude of the projection of $l_i$ onto the local tangent plane. When satellite i is directly overhead, this projection is zero and the displacement $\Delta_x$ contributes zero code-phase uncertainty. Thus, on average, this method reduces the search space further by using the additional knowledge of $l_i$ and $x_k$ and by assuming that the user is on the local tangent plane of the BTS 20. This assumption may not be strictly true due to local topographical variations, but the impact of this error is very small. This projection method can be used without TA information, e.g., with the maximum cell size only. However, this does not provide as much benefit as when TA is used.

As mentioned above, these bounding methods address the second term in equation (4). The third term in equation (4) represents the uncertainty in the satellite position and must be addressed either by network assistance or by demodulating ephemeris from the respective satellite transmissions. For instance, the assistance scheme could provide the ephemeris, which can be used with an accurate time reference to predict the satellite positions to sub-meter accuracy.

The fourth term in equation (4) is the uncertainty due to the bias in the GPS-MS clock. The effect of this bias is shown in the timing diagram of FIG. 4. The top line 80 represents "true" GPS time as kept at the GPS Master Control Station (MCS) (not shown). Vertical hash marks 82 represent 1-ms epochs at which the respective C/A codes roll over to zero phase. The second line 84 represents satellite i's view of GPS time and includes the bias $B_i$ 86. The MCS observes the satellite's transmissions and provides parameters in the navigation message so that user GPS receivers can model $B_i(t)$ with high accuracy. The third line 88 represents the view of GPS time from the reference GPS receiver 24 co-located with the BTS 20 at $x_k$ as shown in FIG. 1a. Although the following description refers to this case, those skilled in the art will recognize that the timing transfer principle applies equally well to the case where the reference GPS receiver 24 is co-located with the TMU as in FIG. 1b. This GPS receiver 24 also has a time bias, but if it has acquired sufficient satellites then its bias bk will be typical for GPS receivers—on the order of 100 ns (0.1 chip) as specified in NAVSTAR GPS Standard Positioning Service Signal Specification, Annex A: Standard Positioning Service Performance Specification (June 1995).

Figure 4:
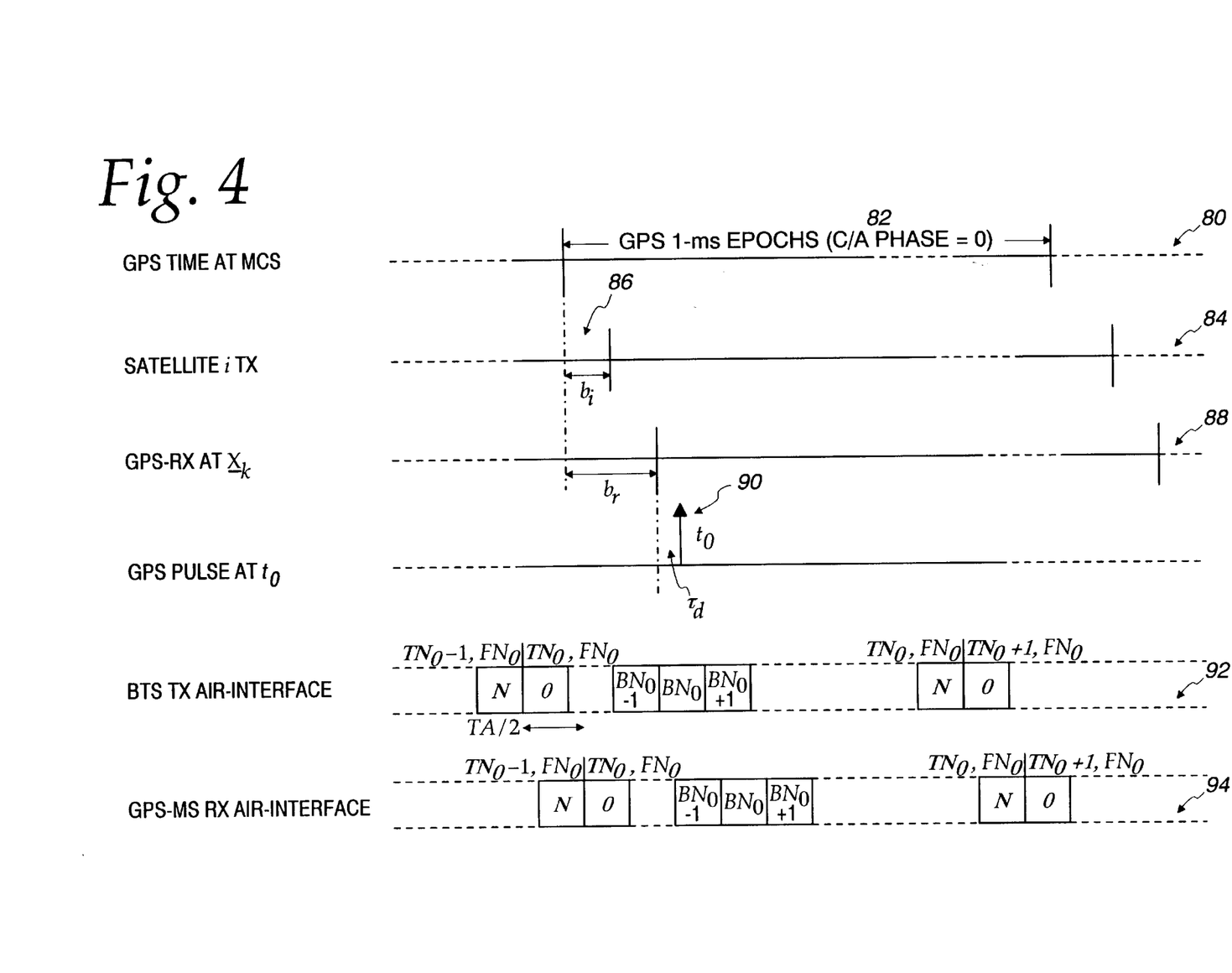
FIG. 4 is a timing diagram illustrating timing relationships in a network assisted GPS.

This invention also provides a bounding method for the uncertainty due to GPS-MS clock bias. In general, this is accomplished by very accurate time-transfer from the BTS 20 to the GPS-MS 10, such that the GPS-MS clock has very accurate knowledge of where the epochs of GPS time occur. This is accomplished in the following steps, all of which refer to FIG. 4:

1. The GPS receiver (GPS-R) 24 at $x_k$ issues a pulse 90 at some time $t_0$ to $BTS_k$. This pulse is intended to occur at an epoch of GPS time, but is actually offset from true GPS time due to the time bias in the GPS receiver 24 ($b_k$) and propagation delays through circuitry and the connection between the GPS-R 24 and the BTS 20 at ($\tau_d$). Based on the speed of modern hardware and the assumption that GPS-R 24 and BTS 20 are co-located, the total delay should be no more than 300 ns.

2. When BTS 20 receives the pulse from GPS-R 24, it samples the state of its transmit (TX) air interface as at 92. Typically, the state includes the bit number within a frame, as well as the frame number within a hierarchical frame structure. The GSM standard uses such a frame structure, which is described in M. Mouly and M. Pautent, *The GSM System for Mobile Communications*, 1992. The state in TDMA systems such as GSM and IS-136 also includes a timeslot number. In FIG. 4, the state of the TX air interface at $t_0$ is $(BN_0, TN_0, FN_0)$ representing bit, timeslot, and frame, respectively.

3. The BTS 20 transmits the state $(BN_0, TN_0, FN_0)$ to the GPS-MS 10 either as a stand-alone message or as part of another message that is particular to the GPS assistance method employed. This transmission may be delivered either exclusively to the individual GPS-MS 10 (point-to-point) or broadcast to all GPS-MS that are currently in the cell served by BTS 20.

4. Prior to receiving the message, the GPS-MS 10 must have gone through the process of locking frequency with BTS 20 and synchronizing with BTS 20's air-interface state. (Typically, this process is specified as part of the standard for the particular cellular system.) When the GPS-MS 10 receives the message as at 94, it derives the time $t_0'$ of its GPS epoch by using $(BN_0, TN_0, FN_0)$ and the TA value in the following relations:
$BN_0' = BN_0 - \lfloor 0.5 \, TA \, \tau_{TA}/\tau_B \rfloor$
$TN_0' = TN_0$
$FN_0' = FN_0$
if $BN_0' < 0$
   Adjust $(BN_0', TN_0')$ for rollover into previous timeslot
   Check rollover into previous frame and adjust $(TN_0', FN_0')$ if necessary
   Check rollover across frame modulo and adjust $FN_0'$ if necessary
end
   where $\tau_B$ is the bit period and the floor operator "$\lfloor \, \rfloor$" returns the integer portion of the argument. After these steps have been completed, the GPS-MS 10 has very accurate knowledge that a GPS epoch occurred at air-interface state $(BN_0', TN_0', FN_0')$ at its receiver.

While the above process describes the basic operation of the time-transfer method, there are several important issues or options. The TA parameter is a very important part of this method, especially for larger cells. If it were not used, then the GPS-MS 10 would have a delay uncertainty from zero up to the maximum one-way propagation delay. For example, the maximum cell radius of 35 km in the GSM system creates an uncertainty of 0–120 $\mu$s (0–119 C/A code chips). When the TA value is used, the remaining uncertainty is the resolution of the one-way delay, which for the GSM example is 0.5-bit (0–1.8 C/A code chips). The time-transfer relative to the GPS epoch is a key part of this invention, but the type of epoch used in the transfer also has some impact on the GPS-MS 10. This is mainly dependent to how the time $t_0$ of the pulse in GPS-R 24 relates to actual GPS time-of-week. If the pulse $t_0$ is based on a millisecond epoch of the C/A code, then through the time transfer the GPS-MS 10 has knowledge of only this epoch. Alternately, if the pulse at $t_0$ is issued at a 20-ms GPS epoch, then the GPS-MS 10 will have knowledge of the bit and code timing of the GPS satellite transmissions at the respective transmitters. This information can be combined with satellite position or range assistance information to provide an excellent estimate of bit timing at the GPS-MS 10. This removes the need for bit-synchronization, which may limit sensitivity or acquisition time performance in some cases. A third alternative is for GPS-R 24 to issue the pulse at a one-second GPS epoch, from which the GPS-MS 10 can derive the bit and code timing. Although the one-second pulse does not add much benefit to the time transfer, it may simplify implementation since most commercial GPS receivers provide a 1-Hz output.

The accuracy of the transfer of the GPS epoch time from GPS-R24 to the GPS-MS 10 depends on several factors. For example, consider that the total time bias in the GPS-MS 10 is given by $$b_{GPS-MS} = b_k + \tau_d + \epsilon_B + \epsilon_{TA} + \tau_{pd}, \quad (9)$$

where $b_k$=GPS-R bias from true GPS time at MCS ($\mu$=0, $\sigma \approx 100$ ns);

$\tau_d$=propagation delay of pulse through GPS-R/BTS path;

$\epsilon_{TA}$=error due to resolution of the TA parameter (uniform distribution over $\pm 0.25 \tau_{TA}$);

$\epsilon_B$=error due to bit-period resolution in BTS air interface (uniform over $0-\tau_B$);

$\tau_{pd}$=propagation delay GPS signals through the GPS-MS receiver.

If a value of 300 ns is assumed for both $\tau_d$ and $\tau_{pd}$, and a value of 500 ns is used to bound the bias in GPS-R, then $$|b_{GPS-MS}| < 1.1 \, \mu s + 0.25 \tau_{TA} + 0.5 \tau_B. \quad (10)$$

For the GSM standard, $\tau_B = \tau_{TA} = 3.7$ $\mu$s which implies that $|b_{GPS-MS}| < 3.88$ $\mu$s. Thus, the uncertainty due to GPS-MS time bias is less than ±4 chips of the C/A code.

The method described above does not require that the GPS-MS 10 have knowledge of absolute GPS time. However, the time-transfer message from the BTS 20 to the GPS-MS 10 can include a field that indicates the absolute GPS time for the epoch event. This would be helpful if the position-computation function (PCF) is located in the GPS-MS 10, since when combined with valued ephemeris it would enable the GPS-MS 10 to compute the satellite positions and thus its own position.

By using these methods to bound the user position and GPS-MS clock bias uncertainties, the overall uncertainty is now quite reasonable. For example, consider the GSM case where the BTS 20 serves a cell with a 10-km radius, and the GPS-MS 10 is displaced 500 m from the BTS 20 such that TA=1. If the GPS-MS 10 uses an assistance scheme that does not provide knowledge of $l_i$ and $x_k$, then $|\Delta\phi_{u,i}| < 2.85$ chips. Consequently, $|\Delta\phi_{u,i}| + |b_{GPS-MS}|$ is less than seven chips. If the assistance data allows the GPS-MS 10 to predict the satellite range to within 6 km (20.5 chips), then the GPS-MS 10 must search over a range of ±27.5 chips around the predicted C/A code phase at the GPS epoch. Thus, the code search space has been reduced by almost 95%. In general, the effect of larger cell sizes is to increase the search space since on average the GPS-MS 10 will be displaced further from the BTS 20. On the other hand, the search space can be reduced if the GPS-MS 10 has knowledge of the satellite positions (e.g., ephemeris).

Narrowing the search ranges as described above requires not only that the GPS-MS 10 receive the very accurate time-transfer message from the BTS 20, but also that it uses this information to align its own time base. In other words, the GPS-MS 10 must set up its time base ("clock") to generate timing events that occur at the local GPS epochs, which are offset from the true GPS epochs as described above. These timing events typically are used by the GPS receiver to begin and end signal processing tasks such as generating local replicas of the appropriate C/A codes and correlating these with the received signal.

Figure 5:
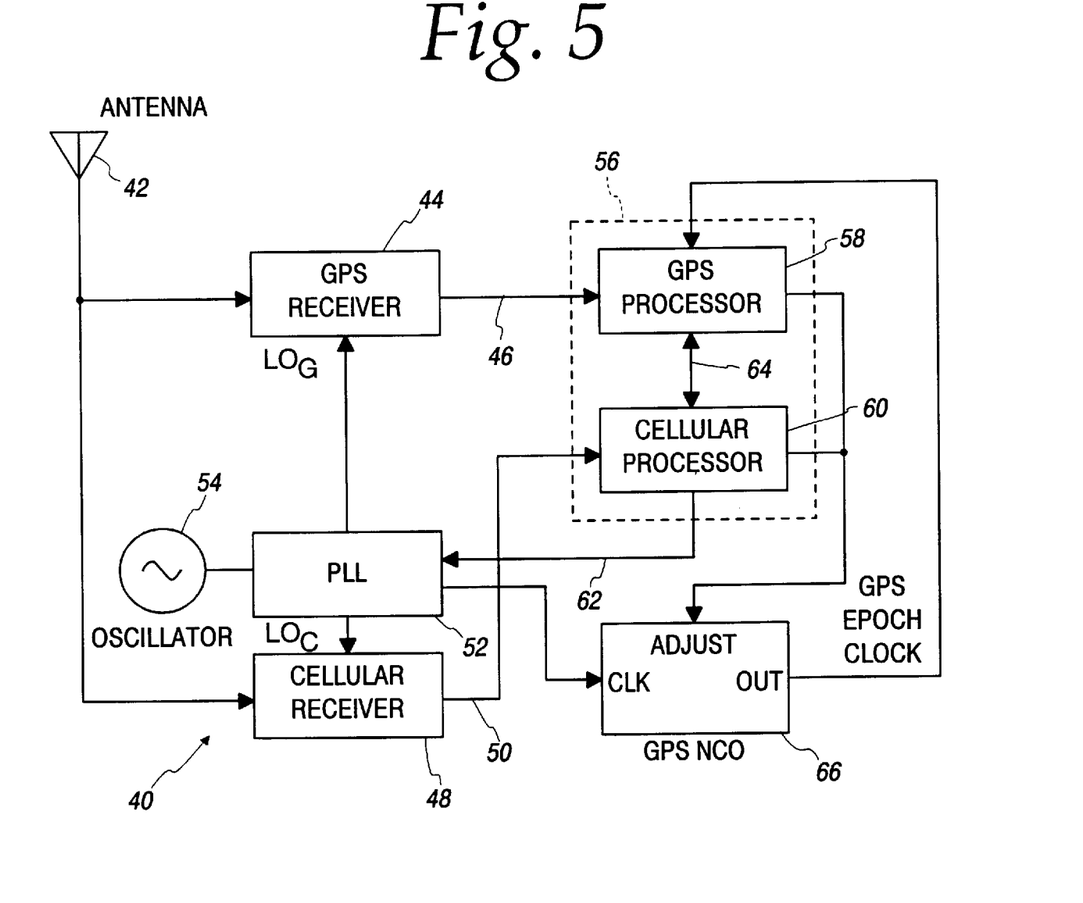
FIG. 5 is a block diagram of the receiver portion of the GPS-MS according to the invention.

FIG. 5 shows a block diagram of a receiver unit 40 of the GPS-MS 10 that uses the time-transfer message to align its local time base. The receiver unit 40 includes an antenna 42 capable of receiving GPS and cellular signals, or separate antennas for each type of signal. A GPS receiver block 44 connected to the antenna 42 selects the GPS signal band, translates it to some lower frequency, and outputs digital samples of the signal in this band on a line 46. A cellular receiver block 48 connected to the antenna 42 selects the appropriate cellular channel, translates it to some lower frequency, and outputs digital samples of the signal in this band on a line 50. A phase-locked loop (PLL) 52 is connected to a free-running oscillator 54 and generates local oscillator signals of the appropriate frequency for both the GPS receiver 44 (LO$_G$) and the cellular receiver 48 (LO$_C$). In addition, the PLL 52 generates the signal from which the GPS epoch timing is generated.

A digital processor block 56 contains both a GPS processor 58 and a cellular processor 60. These processors 58 and 60 accept the digital samples on the lines 46 and 50 from the respective receiver blocks 44 and 48 and perform the processing necessary to extract data and make necessary measurements. The cellular processor 60 also adjusts the PLL 52 via a line 62 such that its outputs are locked to the frequency of the transmissions from the cellular network. Communication between the two processors 58 and 60 is shown via a line 64 in FIG. 5, but this is not a requirement.

A numerically-controlled oscillator (NCO) 66 generates the epoch timing events for the GPS processor 58. The PLL 52 provides the clock source for the NCO 66 and both the GPS and cellular processors 58 and 60 have the capability to control the NCO 66, as described below.

The receiver 40 adjusts the GPS epoch timing by the following process:

1. Prior to receiving the time-transfer message from the BTS 20, the receiver 40 must have gone through the standard procedure for synchronizing in time and frequency with the BTS transmissions. During this process, the cellular processor 60 adjusts the PLL 52 such that its various outputs are locked to the BTS transmission frequency, including the source for the GPS NCO 66.
2. Given the samples from the cellular receiver 48, the cellular processor 60 demodulates the time-transfer message from the BTS 20 and performs the calculations described above. At this point, the cellular processor 60 has knowledge that a GPS time epoch occurred at the (FN$_0$', TN$_0$', BN$_0$') state of the GPS-MS's cellular air interface.
3. The cellular processor 60 determines some future time $t_1$=(FN$_1$, TN$_1$, BN$_1$) at which to update the GPS NCO 66. This time $t_1$ may be an epoch in the cellular timing, such as the beginning of a frame or timeslot. The cellular processor 60 then calculates the desired phase $\theta_{ce}$ of the GPS NCO 66 at $t_1$ by the following:
   $\Delta$FN=FN$_1$−FN$_0$';
   if $\Delta$FN<0,
   $\Delta$FN=$\Delta$FN+frame-counter modulus;
   $\Delta$TN=TN$_1$−TN$_0$';
   $\Delta$BN=BN$_1$−BN$_0$';
   $\Delta\theta_{ce}$=($\Delta$BN $\tau_B$+$\Delta$FN$\tau_F$)$f_{ge}$;
   $\theta_{ce}$=$\Delta\theta_{ce}$−$\lfloor\Delta\theta_{ce}\rfloor$;
   where $f_{ge}$ is the frequency of the GPS epoch used in the GPS processor 58 (typically 1-kHz to correspond with the C/A-code epochs) and "$\lfloor\ \rfloor$" returns the integer value of the argument. The constants $\tau_B$, $\tau_T$, and $\tau_F$ respectively represent the bit, timeslot, and frame periods of the particular cellular air interface.
4. After computing $\theta_{ce}$, the cellular processor 60 converts the value into the numerical format specific to the GPS NCO 66 and programs the GPS NCO 66 such that its phase will start from $\theta_{ce}$ at $t_1$. The cellular processor 60 may receive subsequent time-transfer messages from the BTS 20, which it may use to adjust the phase and/or frequency of the GPS NCO 66. These adjustments are used to remove the effect of any remaining frequency error in the BTS transmissions.
5. Optionally, if the GPS-MS 10 contains the PCF, then it also has the capability to determine the remaining bias or offset in the GPS epoch timing generator. After determining this offset, the GPS processor 58 uses it to adjust the GPS NCO 66 phase or frequency in a similar manner to that described above.

In summary, the invention consists of a method to bound the uncertainty in the C/A code phase measured by the GPS-MS 10 due to the displacement of the GPS-MS 10 from the BTS 20, utilizing the timing advance (TA) information sent from the BTS 20 to the GPS-MS 10 as side information on the cellular system. The invention also provides a method for accurate time-transfer from a GPS receiver 24 co-located with the BTS 20, through the cellular air interface to the GPS-MS 10. This method also bounds the uncertainty in the GPS-MS's code phase measurements by removing a large part of the bias in the GPS-MS's internal GPS timing generation.

A combined cellular/GPS receiver utilizes the time-transfer messages from the cellular network to adjust a numerically-controlled oscillator (NCO), which generates the GPS epoch timing in the receiver.

By bounding the uncertainty in the two ways described above, the GPS-MS 10 is required to search only through a small range of the C/A code during the process of acquiring the GPS satellite signals. These methods reduce the search range by at least an order of magnitude, which results in lower latency in acquiring the signals and computing the user's position. In addition, the invention removes the need for bit-synchronization with the navigation messages broadcast by the satellites, which may limit performance in some cases. Such improvements allow the GPS receiver to compute the position in environments where stand-alone receivers cannot operate.

It is anticipated that those skilled in the art will recognize other benefits as well. In addition, it is worth noting that the methods of this invention may be coupled with almost any other scheme for providing satellite-position-related assistance to a GPS-MS 10.

I claim:

1. The method of reducing code shift searches in a global positioning system (GPS) receiver, the GPS receiver being integrated in a mobile station (MS) including a transceiver operating in a wireless network, comprising the steps of:
   determining a time period representing round trip propagation delay between the MS and a base transceiver system (BTS) serving the MS; and
   calculating a boundary of the code shift uncertainty in the MS using the time period.

2. The method of claim 1 wherein the time period is communicated from the BTS to the MS.

3. The method of claim 2 wherein the time period is a timing advance value identifying a fraction of a symbol transmission rate between the BTS and the MS.

4. The method of claim 1 wherein the code shift uncertainty is bound computed by:

$$|\Delta\phi_{u,i}| < \left(\frac{TA+0.5}{2}\right) \cdot \left(\frac{c \cdot \tau_{TA}}{\lambda_{CA}}\right)$$

where TA is round-trip propagation delay given in network-specific units and $\tau_{TA}$ is time period of the TA units, c is speed of light, and $\lambda_{CA}$ is wavelength of a GPS C/A code chip.

5. The method of claim 1 wherein the BTS communicates location information of the BTS ($x_k$) to the MS and the MS has information representative of satellite location.

6. The method of claim 5 wherein the BTS communicates information representative of visible satellite location to the MS and this information is used in computing the boundary.

7. The method of claim 5 wherein the MS determines positions of visible satellites by using ephemeris information that was previously demodulated from GPS satellite signals and stored in internal memory.

8. The method of claim 5 wherein the code shift uncertainty ($|\Delta\phi_{u,i}|$) to satellite i is bound by:

$$|\Delta\phi_{u,i}| < \sqrt{1 - \frac{\hat{l}_i^T x_k x_k^T \hat{l}_i}{x_k^T x_k}} \cdot \left(\frac{TA + 0.5}{2} \cdot \frac{c \cdot \tau_{TA}}{\lambda_{CA}}\right)$$

where $\hat{l}_i$ is an estimated line-of-sight vector to satellite i, TA is given in network-specific units and $\tau_{TA}$ is a time period of the TA units, c is speed of light, and $\lambda_{CA}$ is wavelength of a GPS C/A code chip.

9. The method of claim 1 wherein the BTS communicates information representative of visible satellite elevations ($\theta^i_k$) to the MS and this information is used in computing the boundary.

10. The method of claim 9 wherein the boundary of the code shift uncertainty ($|\Delta\phi_{u,i}|$) is calculated by $$|\Delta\phi_{u,i}| < \cos\theta_{ik} \cdot \left(\frac{TA + 0.5}{2} \cdot \frac{c \cdot \tau_{TA}}{\lambda_{CA}}\right)$$

where TA is round-trip propagation delay given in network-specific units and $\tau_{TA}$ is time period of the TA units, c is speed of light, and $\lambda_{CA}$ is wavelength of a GPS C/A code chip.

* * * * *